US008495670B2

(12) United States Patent
St. John-Larkin

(10) Patent No.: US 8,495,670 B2
(45) Date of Patent: Jul. 23, 2013

(54) ACCOUNTING FOR VIEWING AND RECORDING OF PROGRAMS

(75) Inventor: David Christopher St. John-Larkin, Denver, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 505 days.

(21) Appl. No.: 11/859,551

(22) Filed: Sep. 21, 2007

(65) Prior Publication Data
US 2009/0083777 A1 Mar. 26, 2009

(51) Int. Cl.
*H04N 7/16* (2011.01)
(52) U.S. Cl.
USPC ............................................................. 725/1
(58) Field of Classification Search
None
See application file for complete search history.

(56) References Cited

U.S. PATENT DOCUMENTS

| | | | |
|---|---|---|---|
| 6,684,400 B1* | 1/2004 | Goode et al. ..................... | 725/61 |
| 7,098,772 B2 | 8/2006 | Cohen | |
| 2002/0022472 A1* | 2/2002 | Watler et al. .................... | 455/405 |
| 2002/0056119 A1 | 5/2002 | Moynihan | |
| 2002/0129358 A1* | 9/2002 | Buehl et al. ....................... | 725/1 |
| 2004/0143838 A1* | 7/2004 | Rose ................................ | 725/25 |
| 2005/0251454 A1* | 11/2005 | Wood .............................. | 705/26 |
| 2006/0136964 A1* | 6/2006 | Diez et al. ....................... | 725/37 |
| 2006/0215990 A1 | 9/2006 | Proebstel | |
| 2007/0124775 A1 | 5/2007 | DaCosta | |
| 2007/0250863 A1 | 10/2007 | Ferguson | |
| 2007/0276511 A1 | 11/2007 | Baker et al. | |
| 2007/0276517 A1 | 11/2007 | Baker et al. | |
| 2007/0276518 A1 | 11/2007 | Baker et al. | |
| 2007/0276519 A1 | 11/2007 | Baker et al. | |
| 2007/0276520 A1 | 11/2007 | Baker et al. | |
| 2008/0130849 A1* | 6/2008 | Mock et al. ............. | 379/114.01 |
| 2008/0134274 A1* | 6/2008 | Derrenberger et al. ....... | 725/131 |

FOREIGN PATENT DOCUMENTS
WO   WO 2006/123318   11/2006

OTHER PUBLICATIONS

PCT International Search Report and Written Opinion dated Dec. 4, 2008.
Family Safe Media, http://www.familysafemedia.com, accessed Dec. 11, 2007, 4 pages.
Satellite TV Rating System Guide, http://www.satellite_savings_com/direct_tv_satellite_free_promotions, accessed Dec. 7, 2007, 6 pages.
Do Web Shoppers Really Spend More?, The Retail Bridge, Dec. 5, 2007, 5 pages.

* cited by examiner

*Primary Examiner* — Vivek Srivastava
*Assistant Examiner* — Rong Le
(74) *Attorney, Agent, or Firm* — Ingrassia Fisher & Lorenz, P.C.

(57) ABSTRACT

A method/system for accounting for viewing/recording of programs via a client device may include: generating an account associated with a client device, the account including a balance; monitoring viewing/recording of programs via the client device; and deducting from the balance based on the viewing/recording of programs via the client device. A method/system for providing viewing/recording of programs via a client device may include: receiving a request to view/record a program via a client device; evaluating the request in view of an account associated with the client device; and allowing the program to be viewed/recorded via the client device based on the evaluation. A method of generating such an account may include: receiving a user request for an account associated with a client device; and setting an initial balance of the account based on the user request, the initial balance including an amount of viewing/recording of programs via the client device.

1 Claim, 4 Drawing Sheets

ACCOUNTING FOR VIEWING AND RECORDING OF PROGRAMS

TECHNICAL FIELD

The inventive field relates generally to providing programs for viewing and/or recording via a client device, such as a set top box (STB), a satellite receiver, a digital video recorder (DVR) or a similar device, and further to accounting for viewing and/or recording of such programs.

BACKGROUND DISCUSSION

The proliferation of subscription television programming, the increasing number of available channels, and the corresponding increase in television programming have led to continued development of various features for systems that provide such programming. Subscription television programming has expanded from providing subscription packages including various sets of channels, to providing subscriptions to individual channels, such as movie channels, subscriptions to event packages, such as seasonal sports channels, and even video-on-demand (VOD) and pay-per-view (PPV) options that allow a subscriber to individually select single program events for viewing and/or recording.

The functionality of client devices has similarly expanded to provide various user interactive features, such as the ability to set timers to record programs, the ability to set user preferences, for example, for how information is displayed, and the ability to lock or otherwise control access to channels. Recent developments include the expansion of such features to remote task scheduling via the internet.

Many client devices are configured to receive programs and program information from one or more sources, generally referred to as the service provider or broadcast service. The programs and the program information may be provided to the client device via one or more communication channels. For example, in a cable broadcast system, the programs and the program information may be provided to the client device via a coaxial cable connected to an input of the client device. In a satellite broadcast system, the programs and the program information may be provided to the client device via a satellite dish that is connected to an input of the client device via a coaxial cable. Alternatively or additionally, the program information may be provided to the client device via a telephone line connected to another input of the client device. The connection to the telephone line may also provide a communication channel for feedback to the service provider, for example, regarding programs viewed via the client device, and/or for allowing pay programs to be ordered or purchased using the client device.

SUMMARY

Although broadcast systems and client devices have advanced in many ways, accounting for viewing and/or recording of programs generally has not advanced from providing a single household account that includes monthly billing for programming services, plus any additional charges for any seasonal packages, VOD and/or PPV that may have been ordered.

One approach to accounting for viewing and/or recording of programs may provide increased user control over such programming. Also, such an approach may provide different solutions for providing and/or for billing for broadcast services.

Various embodiments relate to systems and methods for providing and/or accounting for viewing and/or recording of programs. Embodiments may also relate to generating an account for viewing and/or recording of programs.

Some embodiments may provide a method of accounting for viewing and/or recording of programs via at least one client device. The method may include the operations of: generating at least one account associated with at least one client device, the at least one account comprising a balance; monitoring at least one of viewing and recording of programs via the at least one client device; and deducting from the balance of the at least one account based on the viewing and/or recording of programs via the at least one client device.

Some embodiments may take the form of a method of generating an account for viewing and/or recording of programs via at least one client device. The method may include the operations of: receiving a user request for at least one account associated with at least one client device; and setting an initial balance of the at least one account based on the user request, the initial balance comprising an amount of at least one of viewing and recording of programs via the at least one client device.

Some embodiments may take the form of a method of providing viewing and/or recording of programs via at least one client device. The method may include the operations of: receiving a request to view and/or record a program via a client device; evaluating the request in view of at least one account associated with the client device; and allowing the program to be viewed and/or recorded via the client device based on the evaluation.

Some embodiments may take the form of a system for accounting for viewing and/or recording of programs via at least one client device. The system may include: at least one account associated with at least one client device, the at least one account comprising a balance; and a processor configured to monitor at least one of viewing and recording of programs via the at least one client device and configured to deduct from the balance of the at least one account based on the viewing and/or recording of programs via the at least one client device.

Some embodiments may take the form of a system for providing viewing and/or recording of programs via at least one client device. The system may include: a client device; and a processor configured to receive a request to view and/or record a program via the client device, to evaluate the request in view of at least one account associated with the client device, and to allow the program to be viewed and/or recorded via the client device based on the evaluation.

Some embodiments may take the form of a computer readable storage medium. The computer readable storage medium may include instructions for: generating at least one account associated with at least one client device, the at least one account comprising a balance; monitoring at least one of viewing and recording of programs via the at least one client device; and deducting from the balance of the at least one account based on the viewing and/or recording of programs via the at least one client device. Alternatively or additionally, the computer readable storage medium may include instructions for: receiving a user request for at least one account associated with at least one client device; and setting an initial balance of the at least one account based on the user request, the initial balance comprising an amount of at least one of viewing and recording of programs via the at least one client device. Alternatively or additionally, the computer readable storage medium may include instructions for: receiving a request to view and/or record a program via a client device; evaluating the request in view of at least one account associated with the client device; and allowing the program to be viewed and/or recorded via the client device based on the evaluation.

By using or implementing various embodiments, increased user control of viewing and/or recording of programs via one or more client devices may be provided. Also, increased variety of broadcast services and/or billing arrangements may be provided.

BRIEF DESCRIPTION OF THE DRAWINGS

Various details of the present invention may be better understood on reading the following detailed description of non-limiting embodiments, and on examining the accompanying drawings, in which.

DETAILED DESCRIPTION OF EMBODIMENTS

As used herein, the term "client device" encompasses a device that is configured to receive programs and/or program information from a broadcast source and to facilitate display the programs and/or the program information on a display device, such as a television or a monitor. Although not restricted to a particular implementation, the term "client device" is intended to encompass set top boxes, satellite receivers, digital video recorders, and the like.

The client devices described herein may be embodied in software and/or hardware that facilitate the reception and display of programs and/or program information from a broadcast source or any suitable type (e.g., satellite, Internet protocol, wireless, etc.).

The embodiments shown in the figures illustrate systems and methods that may allow viewing and/or recording of programs via client devices to be provided, managed and/or accounted. The illustrated systems and methods provide examples of how such provision, management and/or accounting may be implemented. However, it should be understood that other implementations are possible and contemplated. Also, it should be understood that references herein to "accounting" is not limited to a restrictive definition, such as general accounting for a business or professional accounting services. Rather, the term is used herein to encompass any and all manners of providing, managing and/or tracking viewing and/or recording of programs as broadly described.

Figure 1:
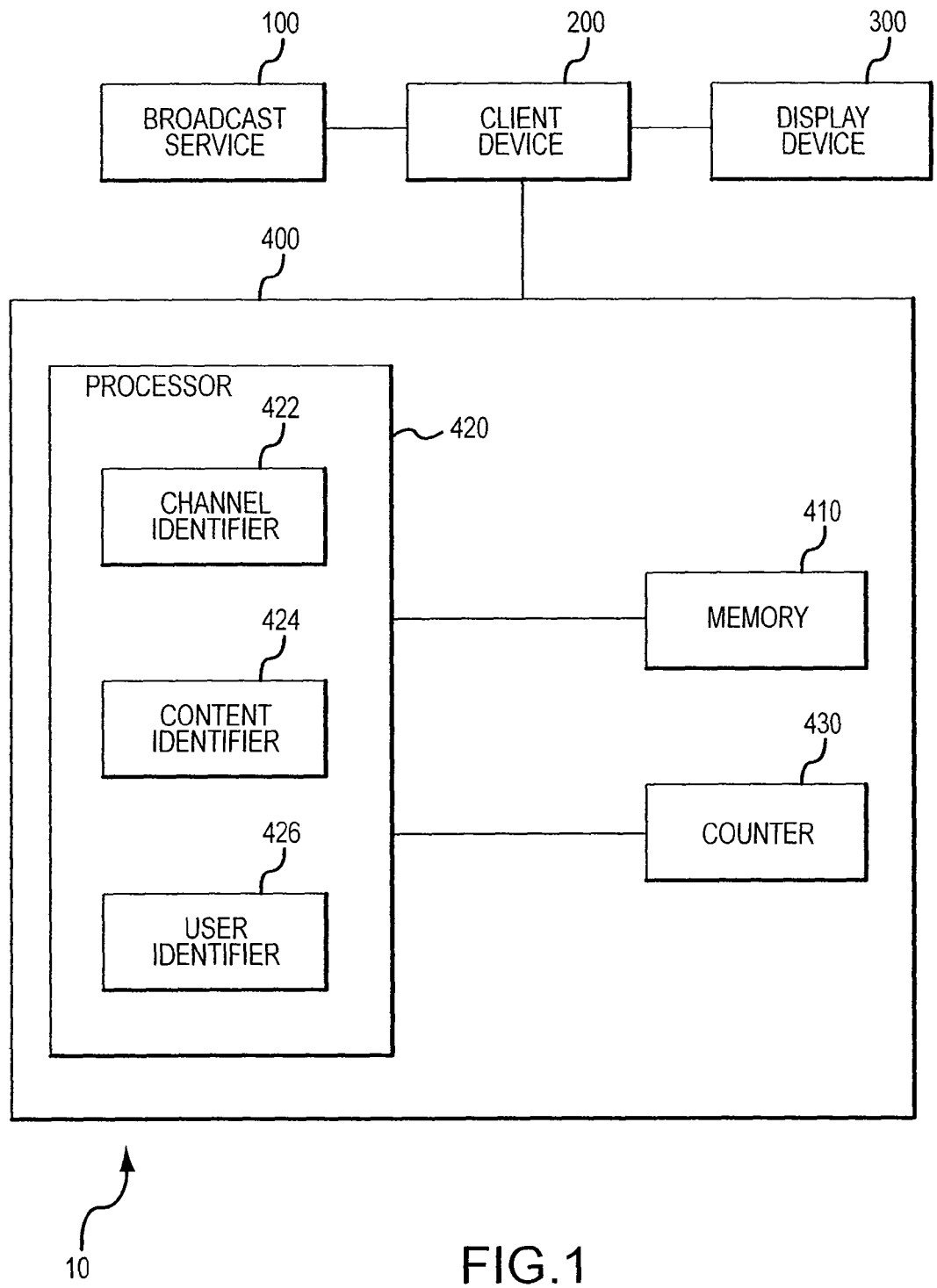
FIG. 1 is a simplified block diagram illustrating various components of an exemplary system for providing and/or accounting for viewing and/or recording of programs.
Figure 2:
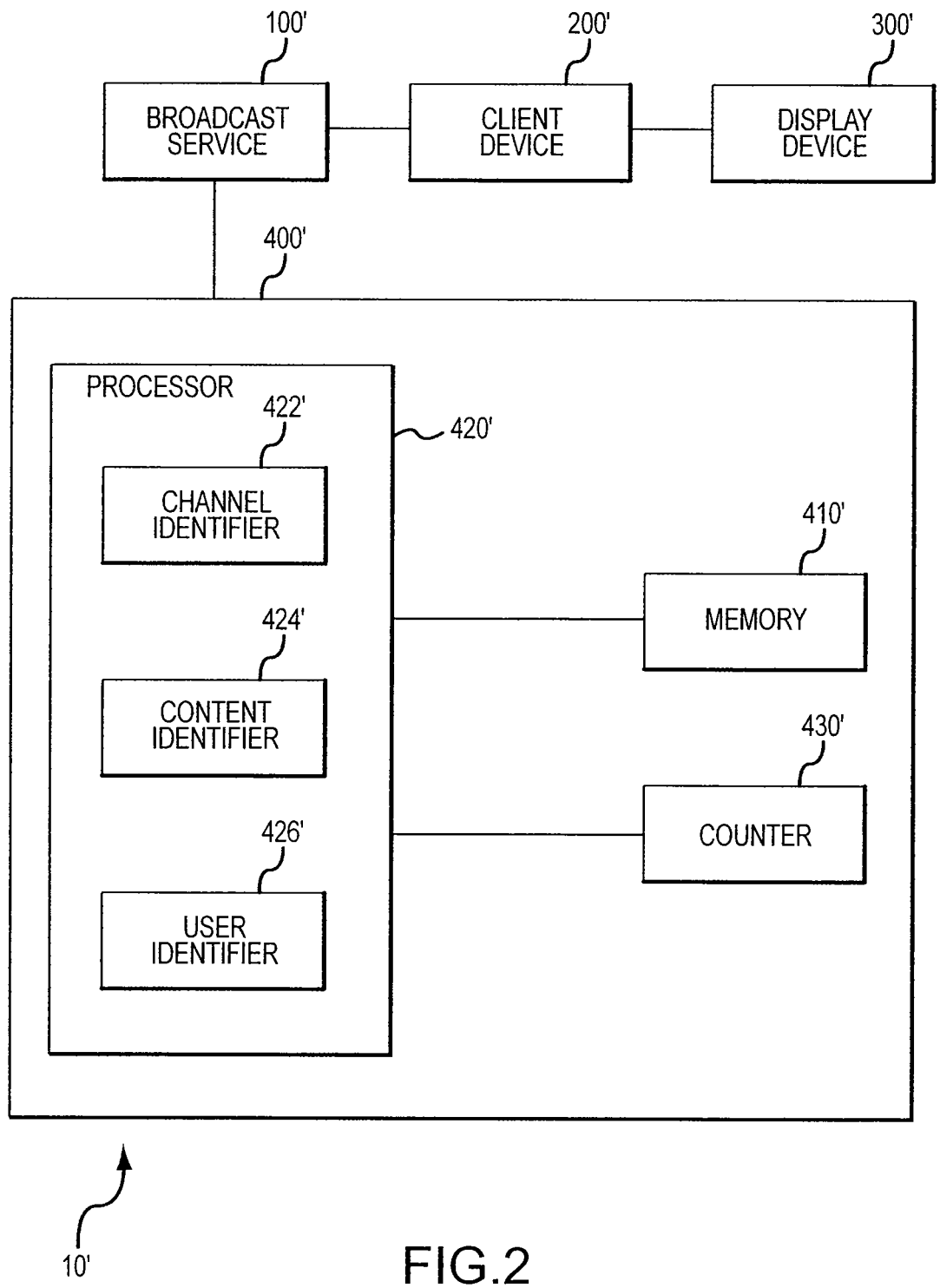
FIG. 2 is a simplified block diagram illustrating another exemplary a system for providing and/or accounting for viewing and/or recording of programs.
Figure 3:
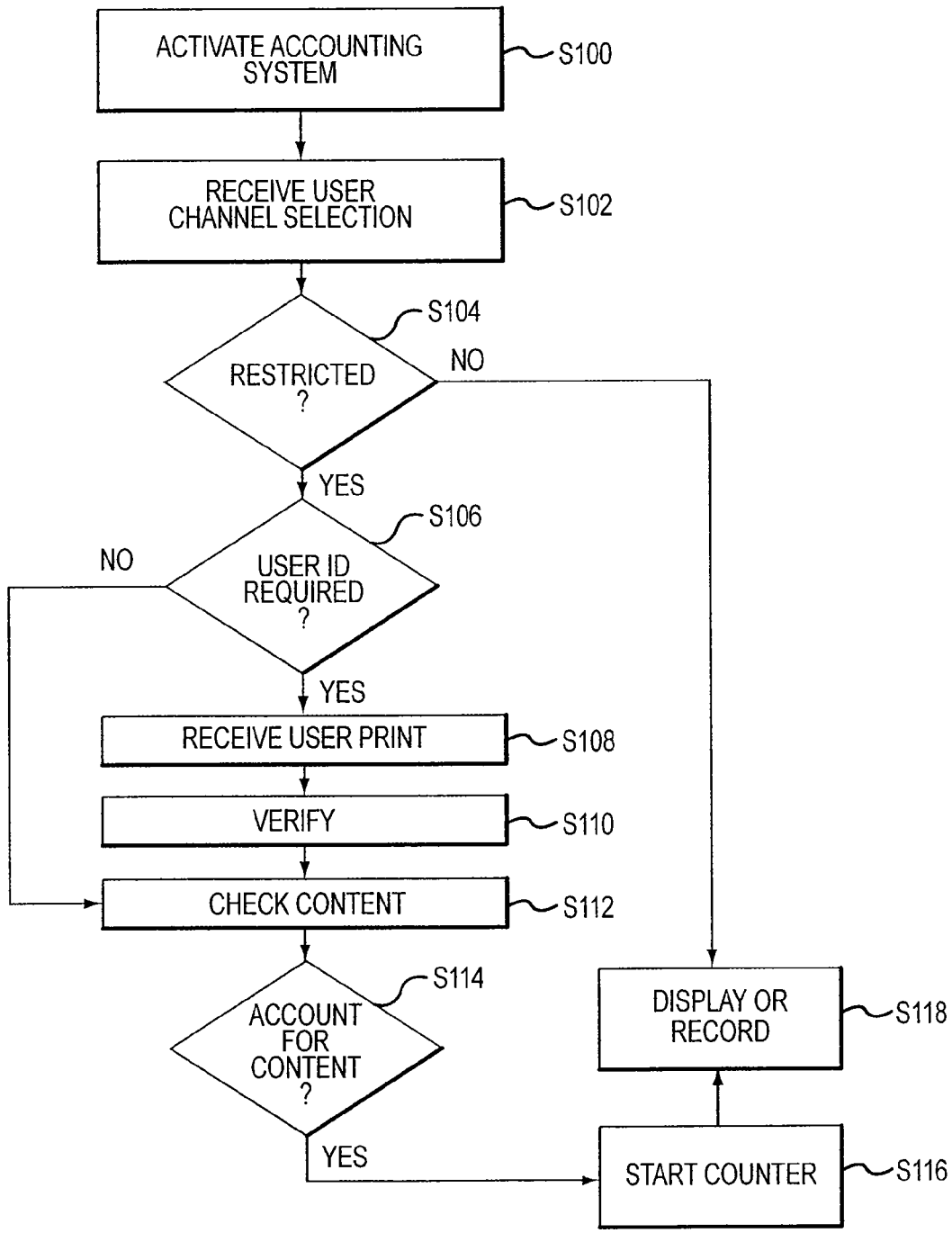
FIG. 3 is a flowchart illustrating an exemplary method of accounting for viewing and/or recording of programs via one or more client devices.
Figure 4:
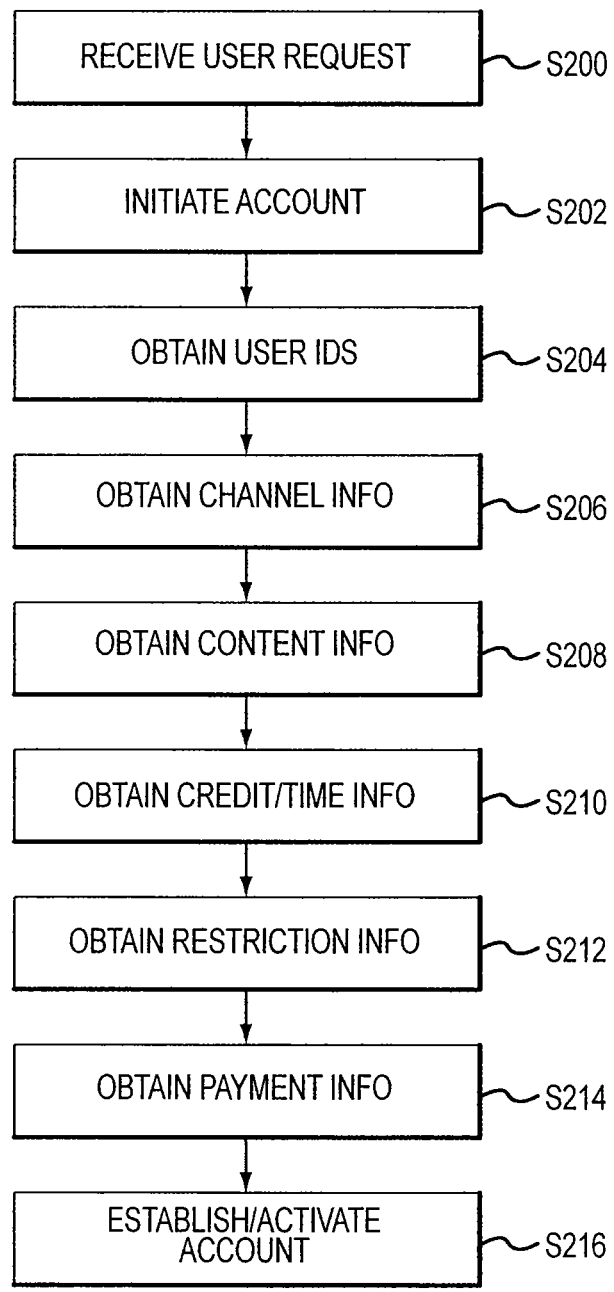
FIG. 4 is a flowchart illustrating an exemplary method of generating an account for viewing and/or recording of programs via one or more client devices.

The block diagrams shown in FIGS. 1 and 2, and the flowcharts shown in FIGS. 3 and 4, are for illustration only and are not intended to represent the only possible methods and system configurations. In particular, it should be understood that method operations may be added, omitted and reordered as may be suitable to a particular application or embodiment. Also, individual components may be added, omitted, replaced and interrelated as may be suitable to a particular application. All details appurtenant to implementing the exemplary processes and systems that are well understood in the art are omitted for simplicity and clarity.

The embodiments shown in the figures illustrate systems and methods that may provide a unique approach to providing programs via a broadcast service. Such systems and methods may also provide a unique approach to managing viewing and/or recording of programs. In general, one or more accounts may be established for one or more client devices. The account(s) may include a balance that defines the capability of the client device(s) to record programs and/or to provide programs for viewing. Alternatively or additionally, the balance may provide a way of tracking the recording and/or viewing of programs via the client device(s).

The account(s) and/or balance(s) may be established to control or otherwise manage programs that may be viewed and/or recorded via the client device(s). The account(s) and/or balance(s) may determine programs that may be viewed and/or recorded based on a cost associated with the channel, the content and/or the type of program. Further, account(s) and/or balance(s) may determine programs that may be viewed and/or recorded based on the user and/or the client device. For example, parental control may be envisioned to lock children from viewing channels and/or programs other that set for the children's account(s).

The account(s) and/or balance(s) may include one or more restrictions that control or otherwise manage programs that may be viewed and/or recorded via the client device(s). For example, restrictions may be established that limit the viewing and/or recording of programs to a specified time frame, a specified channel, a specified content, a specified user and/or a specified client device. In some embodiments, the account (s), the balance(s) and/or the restriction(s) may be set up and/or managed via a client device. Further, accounts, balances and/or restrictions may be set up and/or managed for a group of client devices, such as those of a particular household or subscriber. Set up and/or management may be made by an authorized user or an authorized client device, for example, to restrict access to the account(s).

FIG. 1 is a simplified block diagram illustrating components of an exemplary system 10 that may be used to implement various features described herein. In particular, FIG. 1 generally illustrates a client device 200 that receives programs from a broadcast service 100 and may display the programs on a display device 300. In this example, the client device has access to an accounting system 400. The accounting system 400 may be associated with the particular client device 200 or may be configured to identify the client device 200. Thus, the accounting system 400 may be implemented as part of the client device 200, or may be implemented separately, for example, to serve multiple client devices. Details of the broadcast service 100, the client device 200 and the display device 300 are not discussed herein for the sake of brevity, as these components may be of any known or hereafter developed types or configurations (e.g., digital broadcast satellite, cable, Internet; set top boxes, digital video recorders; monitors, televisions).

The client device 200 may have one or more accounts associated therewith. As discussed herein, these accounts are in addition to, and may differ from, the broadcast service account of a subscriber. For example, an account may be established for each individual user of the client device 200, and/or separate accounts may be established for multiple client devices associated with a single broadcast service account. For the sake of illustration and clarity, only a single client device 200 is discussed in detail. However, it should be understood that various permutations are possible to encompass embodiments involving multiple client devices and/or multiple users.

In general, an account associated with the client device 200 may include a balance. The balance may define an amount of viewing and/or recording of programs that may be performed via the client device 200. For example, an account may include a balance comprising a number of programs, a number of time blocks and/or an amount of time. Any combination of such "units" for counting programs viewed and/or recorded may be used. Further, an account may have a plurality of balances, for example, one balance for viewing programs and another balance for recording programs. As discussed below, it should be understood that balances may be defined for a particular user, channel, program content, program type, etc., in addition to viewing and/or recording. As such, balances may provide management and/or control of viewing and/or recording of programs via the client device 200.

The accounting system 400 may store the account(s) and the balance(s) in a memory 410. A processor 420 of the accounting system may be configured to access the account(s) and the balance(s) from the memory 410 to control or otherwise manage programs that are viewed or recorded via the client device 200. For example, when a user of the client device 200 wants to view or record a program, the processor 420 may access the account(s) and balance(s) stored in the memory 410 to determine whether the program may be viewed or recorded via the client device.

The determination may be as simple as determining whether there is a sufficient balance for the requested viewing/recording. The determination may, however, involve more criteria or complex analysis, such as an evaluation of the channel, the content and/or the user. The processor 420 may include various circuits or routines capable of such evaluations.

For example, the processor 420 may include a channel identifier module 422 that is configured to evaluate the channel of the requested program. The channel identifier module 422 may determine whether the channel is one that may be viewed or recorded via the client device 200 and whether there is a remaining balance for that channel. For example, if an account stored in the memory 410 includes a balance for the channel, the processor may allow the program to be viewed or recorded via the client device 200. If not, the user may be notified that an insufficient balance is in the account for viewing/recording the requested program, and may prompt the user to refill the balance. Alternatively or additionally, if there is no balance associated with the channel, the processor may not allow the programs of the channel to be viewed or recorded via the client device 200 and may so inform the user. Alternatively, it may be desired that programs of a channel that does not have a balance associated therewith are always viewable/recordable via the client device 200.

In such a manner, the accounting system 400 may either allow or prevent viewing/recording of programs on a specified channel on the client device 200. Viewing and/or recording of programs may thus be controlled or otherwise managed based on channels, which may be allowed, blocked or counted. For example, when the requested program is broadcast on a channel for which there is a balance, the program may be viewed/recorded via the client device 200. As the program is viewed or recorded, a counter 430 may account for the viewing/recording so that the viewing/recording required for the requested program may be deducted from the balance. For example, the counter 430 may act as a timer to determine the minutes used for the viewing/recording, may count a number of time blocks used for the viewing/recording, or may simply count the program itself as a single unit. Thus, as programs are viewed or recorded via the client device 200, the accounting system 400 may reduce the associated balance until an insufficient balance remains for a requested program to be viewed/recorded via the client device 200.

Similarly, the processor 420 may include a content identifier module 424 that is configured to evaluate the content of the requested program. The content identifier module 424 may determine whether the content may be viewed or recorded via the client device 200 and may determine whether there is a balance for that content. For example, if an account stored in the memory 410 includes a balance for the particular content, such as sports, the processor may allow the program to be viewed or recorded via the client device 200. If not, the user may be notified that an insufficient balance is in the account for viewing/recording the requested program. Alternatively or additionally, if there is no balance associated with the content, the processor may not allow programs including such content to be viewed or recorded via the client device 200 and may so inform the user.

The processor 420 may also include a user identifier module 426 that is configured to evaluate the identity of the user requesting the program. The user identifier module 426 may determine whether the user has access to the program via the client device 200, for example, by requiring a password. Further, the user identifier 426 may allow a corresponding account or balance to be accessed. Thus, the client device 200 may have different accounts and/or balances for different users.

It should be understood that user and/or content based evaluation may be effective for limiting the content of programs that may be viewed or recorded, thereby implementing, for example, a parental control. For example, some channels may be freely available, such as public broadcast system (PBS) channels, while some channels' availability may be limited (e.g., Nickelodeon) and some channels may be unavailable (e.g., adult channels). It may also be effective for limiting the amount of particular content in general that is viewed or recorded. For example, if a user wishes to limit his time spent watching sports or other content, he may use an account or balance for such content. Implementation may be based, for example, on a unique identifier associated with each program. The unique identifier may include information regarding the content of the program, such as its theme (e.g., drama, football, etc.), rating (e.g., mature, "G", etc.), type (e.g., movie, sitcom, news, etc.), as well as any association it may have with other programs.

Although not illustrated in FIG. 1, it should be understood that the account(s) or balance(s) may be, alternatively or additionally, restricted. Restriction may limit the viewing or recording via the client device to a specified time frame, a specified channel, a specified content, and/or a specified user. In embodiments in which the account(s) or balance(s) are associated with multiple client devices, the restriction may limit the viewing or recording to a specified client device. Such restrictions may provide for further control or management of programs that may be viewed and/or recorded via client devices.

Further, although the accounting system 400 may be used to provide control and/or management of programs that are viewed and/or recorded via the client device 200, it should be understood that the accounting system 400 may be used to provide broadcast services as well. For example, a subscriber may be allowed to establish accounts for viewing and/or recording particular programs of particular channels, programs of particular content or type, etc., to which the subscriber otherwise does not have access based on his broadcast service account. For example, the subscriber may wish to set up an account to allow viewing and/or recording of a certain number of movies (e.g., number of time slots or amount of time) broadcast on a premium channel, rather than having a monthly subscription to the premium channel. Similarly, a subscriber may wish to set up an account to allow a certain number of premium programs, such as NFL football games, to be selected for viewing and/or recording during a season, rather than purchasing a package including all of the premium programs of the entire season. Thus, an effective alternative or addition to VOD, PPV, premium channels, premium packages and the like may be to allow a user to establish one or more accounts to selectively access (view and/or record) various programs.

FIG. 2 illustrates another example of a system 10' for providing and/or accounting for viewing and/or recording of programs. The system 10' may be similar to the system 10 described above with respect to FIG. 1, and may include a broadcast service 100', a client device 200', a display device 300' and an accounting system 400', which may include a memory 410', a processor 420', a counter 430', as well as a channel identifier 422', a content identifier 424' and a user identifier 426'. However, the accounting system 400' may be associated with the broadcast service 100'. Thus, it should be understood that the accounting system 400' may be implemented on the service provider side, as opposed to on the client side as in FIG. 1. Further, it should be understood that the accounting system may be partially implemented on both sides, as appropriate or desired.

As examples of various methods that may be envisioned, FIGS. 3 and 4 illustrate methods for accounting and for generating an account, respectively, for viewing and/or recording of programs. It should be understood that these are simplified examples for ease of discussion, and that any number of modifications and/or additions are possible. Thus, it should be understood that the various details discussed herein are sufficient to be implemented in appropriate methods other than that illustrated in FIGS. 3 and 4.

In the example for accounting for viewing and/or recording of programs of FIG. 3, operation may begin at S100 by activating the accounting system. The system may always be "on" and not require such an operation once initially set up with an account. However, it is contemplated that the system may be activated as desired to implement a "baby sitter mode" or the like to control, limit or otherwise manage programs that may be viewed and/or recorded via the client device. For situations in which multiple client devices are associated with the accounting system, it may be possible to activate the accounting system for selected client devices only, or to activate the accounting system to provide different levels of restricted or accounted viewing/recording of programs to different client devices.

Operation may continue to S102, where a user channel selection may be received via the client device. It should be understood that the user channel selection may be a selection of a current or future time slot of the channel. Next, at S104, a determination may be made as to whether the selected channel is restricted or not. This determination may be made, for example, by a suitably configured processor, implemented either at the client device or elsewhere. The determination may be based on one or more criteria, either in parallel or series, as desired. For example, a channel may be flagged or otherwise identified as being restricted. In some embodiments, a channel that has an account associated with it may be considered to be restricted.

If the selected channel is not restricted, then operation may jump to S118, where the current program of the selected channel may be displayed or the future program of the selected channel may be recorded, such as by setting a timer to record the future program. If the selected channel is restricted, then operation may continue to S106, where a determination may be made as to whether user identification is required.

If so, then operation may continue to S108, where user input may be received, such as a password or code. Then, at S110, the user input may be verified. Although not shown, it should be understood that a conventional loop may be employed for user identification/verification before proceeding to S112, for example, with denial of access for a predetermined number of failed verifications. As shown in FIG. 3, if user identification is not required, operation may continue directly to S112.

At S112, the content of the current or future program of the selected channel may be checked or evaluated. For example, the subject matter, the rating or the type of the program, or any other criteria for assessing program content, may be checked or evaluated. In some embodiments, the operation at S112 may comprise identifying one or more characteristics of the content of the program. Then, operation may continue to S114 where a determination may be made as to whether an account exists for the content of the program. If not, although not explicitly shown, access to the requested channel/program may be denied, for example, with a notification to the user of the client device.

If an account for the content does exist, then operation may continue to S116, where, for a current program, a counter may be started, and to S118, where the program may be displayed and/or recorded. For a future program, operation may initially skip S116, and proceed directly to S118 to set a timer to record the program. In such case, operation may return to S116 to start the counter once the recording has begun. The counter may measure the amount of program viewing and/or recording in terms of elapsed time (e.g., minutes, hours, etc.), number of time slots (e.g., half-hour or hour), or number of programs (e.g., a single count or credit for each distinct program). The amount of program viewing and/or recording may be deducted from the account as measured by the counter.

Although not illustrated in FIG. 3, it should be understood that the restrictions or access limitations on programs for the client device may also be based on the desired output for the program, i.e., viewing or recording. In other words, an account may be limited to recording of programs, or may address viewing of programs as well or instead. Thus, viewing and recording of programs may be treated differently, for example, by deducting more from an account for recording than for viewing or deducting only for recording, or may be treated the same.

In the example for generating an account for viewing and/or recording of programs of FIG. 4, operation may begin at S200, where a user request may be received from a subscriber to establish an account associated with one or more client devices. Next, in S202, an account may be initiated. This may involve, for example, identifying the subscriber account and the client device(s) to be associated with the account.

Operation may continue to S204, where user identification for access to the account or authorization to use the account my be obtained. This operation may involve, for example, establishing a user password or code associated with the account. This may also involve an identification of the client device associated with the account, so that identification of the client device that may access the account for modification purposes. This may be implemented, for example, to identify a master client device from a plurality of client devices of a household that may be allowed to use the account. Multiple users and/or client devices may be associated with the account as appropriate or desired.

Operation may continue to S206, where channel information may be obtained. This operation may involve identifying one or more channels to be associated with the account such that viewing and/or recording programs that are broadcast on the channel(s) will withdraw or deduct from the account. It should be understood that channels may in fact be groups of channels for this operation, such as the Home Box Office (HBO) or ESPN families or channels.

Operation may continue to S208, where content information may be obtained. Program content may be identified by rating, by type (movies, sports, news, education, etc.) by theme or genre (drama, horror, sci-fi, etc.), by audience (children, teens, adults, etc.) or any other suitable criteria related to the program content. This operation may be in additional to or as an alternative to the operation of S206. For example, for a given channel or groups of channels associated with the account, particular content may be identified, such as, for the HBO channels, only movies with family, "G"-rated or similar content may be associated with the account.

Operation may continue to S210, where credit or time information may be obtained. Such information may be used to establish an initial balance for the account. As noted above, this may be in terms of time, number of time slots, number of programs, or any other suitable unit or measure for viewing and/or recording of programs.

Operation may continue to S212, where restriction information may be obtained. Such information may be used to establish any other criteria for use of the account. For example, a specific timeframe may be associated with the account. This operation may also be in addition to or as an alternative to the operation of S206 and S208, such that the account may allow viewing/recording only during the specified timeframe, or may allow viewing/recording on a specified channel or channels during the specified timeframe. Further, this operation may place any other desired restriction on the amount to establish parameters of its use. For example, the account may allow programs to be viewed, but not recorded.

Operation may continue to S214, where payment information may be obtained. Such information may not be necessary, for example, where the subscribers account is automatically billed for the amount balance or use, or where the account is for control or management only. Still, the service provider may impose a fee for the account service itself, for the benefit of allowing such user control of viewing and/or recording via client devices, even where no additional program charges are contemplated.

Once the desired number of operations are completed to obtain such information as discussed above, operation may continue to S216, where the account may be established and/or activated. Although not illustrated, it should be understood that operations for modifying the account, including but not limited to, changing any operating parameters or adjusting the account balance may be implemented.

It should be understood that each of the foregoing operations may be optional for a given implementation and that the various operations may be combined, as appropriate or desired. For example, a user interactive approach may involve piecemeal operations to collect information from the user to generate the account. Alternatively, all user input may be obtained by a single operation, for example, by the user completing a form including various operations for the account. Further, as noted above, the account may be established on the client side or the provider side, or both, as appropriate or desired. For example, in embodiments in which the account is only for control or management of programs for viewing/recording via the client device(s), the account may be implemented solely on the client side, for example, as a feature of the client device(s).

Although various details have been described herein with reference to particular embodiments, it is to be understood that these embodiments are merely illustrative of principles and applications. It is therefore to be understood that numerous modifications may be made to the illustrative embodiments and that other arrangements may be devised without departing from the spirit and scope of this disclosure.

What is claimed is:

1. A system for accounting for viewing and/or recording of programs via at least one client device, the system comprising:

at least a first and a second client device operable to access restricted and unrestricted programs, the restricted programs belonging to one or more categories;

at least one user account associated with the second device but not the first device, the at least one user account comprising one or more balances, each balance being an allotment of time for viewing and/or recording programs in a particular category, each balance being deductible based on whether a viewed and/or recorded program belongs to the particular category; and a processor configured to monitor at least one of viewing and recording of programs via the first and second client device to determine if the program viewed and/or recorded is restricted or unrestricted, configured to allow the program to be viewed and/or recorded if the program is unrestricted, configured to allow the program to be viewed and/or recorded if the program is restricted but viewed and/or recorded on the first client device, configured to deduct from a balance of the at least one user account based on the viewing and/or recording of programs via the second client device if the viewed and/or recorded program is restricted and belongs to a particular category, and configured to allow the viewed and/or recorded program to continue to be viewed and/or recorded on the second device if the program to be viewed and/or recoded is restricted and the balance for the category associated with viewed and/or recorded program is non-zero.

* * * * *